United States Patent
Suzuki et al.

(10) Patent No.: US 8,729,204 B2
(45) Date of Patent: May 20, 2014

(54) COMPOSITIONS AND METHOD FOR PRODUCING POLY-AMINOFUNCTIONALIZED POLYMERIZATION INITIATORS AND CORRESPONDING POLYMERS

(75) Inventors: Eiju Suzuki, Tokyo (JP); Terrence E. Hogan, Uniontown, OH (US)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 13/395,240

(22) PCT Filed: Sep. 10, 2010

(86) PCT No.: PCT/US2010/048390
§ 371 (c)(1),
(2), (4) Date: Jun. 26, 2012

(87) PCT Pub. No.: WO2011/031943
PCT Pub. Date: Mar. 17, 2011

(65) Prior Publication Data
US 2012/0259056 A1    Oct. 11, 2012

Related U.S. Application Data

(60) Provisional application No. 61/241,082, filed on Sep. 10, 2009.

(51) Int. Cl.
| | | |
|---|---|---|
| C08F 236/10 | (2006.01) | |
| C08F 4/48 | (2006.01) | |
| C08F 4/50 | (2006.01) | |
| C08L 9/00 | (2006.01) | |
| C08L 9/06 | (2006.01) | |
| C07F 7/10 | (2006.01) | |
| C07C 211/09 | (2006.01) | |
| C07C 211/13 | (2006.01) | |
| C08F 6/00 | (2006.01) | |
| C08K 3/36 | (2006.01) | |
| C08K 5/09 | (2006.01) | |

(52) U.S. Cl.
USPC ........... 526/340; 526/178; 526/180; 526/183; 526/190; 526/335; 525/232; 524/526; 556/9; 556/12; 556/412; 564/511; 564/512

(58) Field of Classification Search
USPC ............... 526/178, 180, 190, 340, 183, 335; 556/412, 9, 12; 524/526; 525/232; 564/511, 512
See application file for complete search history.

(56) References Cited

U.S. PATENT DOCUMENTS

| 4,015,061 | A | 3/1977 | Schulz et al. | |
|---|---|---|---|---|
| 6,121,474 | A * | 9/2000 | Schwindeman et al. | 556/410 |
| 6,891,019 | B2 | 5/2005 | Brockmann et al. | |
| 7,342,070 | B2 | 3/2008 | Tsukimawashi et al. | |
| 7,767,774 | B2 * | 8/2010 | Suzuki et al. | 526/194 |

FOREIGN PATENT DOCUMENTS

| EP | 1457501 | 9/2004 |
|---|---|---|
| EP | 1734060 | 12/2006 |
| EP | 1772466 | 4/2007 |
| EP | 1942120 | 7/2008 |
| EP | 2075278 | 7/2009 |
| GB | 2108139 | 5/1983 |

OTHER PUBLICATIONS

Adams, Florian, Nov. 17, 2010 International Search Report with Written Opinion (11 pp.).

* cited by examiner

*Primary Examiner* — Fred M Teskin
(74) *Attorney, Agent, or Firm* — Meredith E. Hooker; Arthur M. Reginelli

(57) ABSTRACT

Compositions and methods for producing polymerization initiators comprising at least two protected primary amine groups. Polymers prepared using such polymerization initiators can comprise a residue of the polymerization initiator and can initially comprise the at least two protected primary amine groups. Such polymers can undergo a deprotection process thereby yielding a polymer having one or more unprotected primary amine groups. Polymers having primary amine groups can be employed in rubber compositions, which have a variety of potential applications, such as, for example, in tire manufacturing.

44 Claims, No Drawings

COMPOSITIONS AND METHOD FOR PRODUCING POLY-AMINOFUNCTIONALIZED POLYMERIZATION INITIATORS AND CORRESPONDING POLYMERS

This application is the national-stage application of International Application Serial No. PCT/US2010/048390, filed on Sep. 10, 2010, which claims the benefit of U.S. Provisional Application Ser. No. 61/240,082, filed on Sep. 10, 2009, which are incorporated herein by reference.

BACKGROUND

1. Field

One or more embodiments of the invention relate to poly-aminofunctionalized polymerization initiators and polymers produced therefrom.

2. Description of Related Art

In recent years, there has been an increased demand to reduce the fuel consumption of automobiles, driven in part by the rise of interest in environmental issues. One manner in which to cope with such demand has been to reduce the rolling resistance of tires. Various methods have been attempted to reduce the rolling resistance of tires, including the use of a variety of rubber additives. Also, it is known that the performance of rubber compositions on a wet road surface can be largely improved by using an inorganic filler, such as silica or the like, together with a carbon black filler. Accordingly, additives and polymers having increased interaction with such fillers for use in tire manufacturing have been developed. However, improvements are still needed.

SUMMARY

One embodiment of the invention concerns a polymerization initiator comprising at least two protected primary amine groups, where the polymerization initiator further comprises at least one metal selected from alkali or alkaline earth metals, and where the metal is not located on any of the protected primary amine groups.

Another embodiment of the invention concerns a composition comprising a polymer comprising at least one residue of a polymerization initiator, where the polymerization initiator comprises at least two protected primary amine groups.

Yet another embodiment of the invention concerns a method of making a polymer. The method of this embodiment comprises combining at least one type of monomer with at least one polymerization initiator to thereby form the polymer. The polymerization initiator comprises at least two protected primary amine groups and the polymer comprises at least one residue of the polymerization initiator.

DETAILED DESCRIPTION

In accordance with one or more embodiments of the present invention, there is provided a polymerization initiator comprising at least two protected primary amine groups and at least one metal. The polymerization initiators can be employed in producing a polymer, which can contain at least one residue of the polymerization initiator. Additionally, such polymers can be employed as at least a portion of a rubber component used to form a rubber composition suitable for use in a variety of applications, such as, for example, tire manufacturing.

As mentioned above, the polymerization initiator can comprise at least two protected primary amine groups. As used herein, the term "primary amine group" shall denote an amine group having two hydrogen atoms (i.e., R—$NH_2$). Also, as used herein, the term "protected primary amine group" shall denote a primary amine group having either one or both of its hydrogen atoms substituted with a protecting group. The term "protecting group," as used herein, shall denote a moiety that inhibits reaction of the primary amine under polymerization conditions, but is removable via a deprotection process. In one or more embodiments, the protecting group can be suitable to prevent reaction of a protected primary amine group under living anionic polymerization conditions.

In one or more embodiments, the polymerization initiator can comprise at least one protecting group per protected primary amine group. In other embodiments, each protected primary amine group on the polymerization initiator can comprise two protecting groups. Suitable protecting groups can comprise a silyl group or a silylene group, either substituted or unsubstituted. In one or more embodiments, at least a portion of the silyl or silylene groups employed can be substituted silyl or silylene groups. Additionally, substantially all of the silyl or silylene groups can be substituted silyl or silylene groups. Such substituted silyl or silylene groups can comprise one or more alkyl or aryl groups. As used herein, the term "alkyl" shall denote a univalent group formed by removing a hydrogen atom from a hydrocarbon, and may include heteroatoms. As used herein, the term "aryl" shall denote a univalent group formed by removing a hydrogen atom from a ring carbon in an arene (i.e., a mono- or polycyclic aromatic hydrocarbon), and may include heteroatoms. Alkyl or aryl groups suitable for use in substituted silyl or silylene groups include any substituted or unsubstituted $C_1$ to $C_{20}$ alkyl or aryl groups. Additionally, alkyl groups suitable for use can be straight, branched, or cyclic, and can be saturated or unsaturated. Examples of suitable alkyl substituents include, but are not limited to, methyl, ethyl, n-propyl, isopropyl, n-butyl, isobutyl, sec-butyl, tert-butyl, pentyl, hexyl, octyl, decyl, dodecyl, cyclopentyl, and cyclohexyl groups. Also, the aryl group can have a substituent such as lower alkyl group on its aromatic ring, and includes, for example, phenyl, tolyl, xylyl, and naphthyl groups. Specific examples of substituted silyl groups suitable for use include, but are not limited to, trimethylsilyl, triethylsilyl, methyldiethylsilyl, dimethylethylsilyl, and tert-butyldimethylsilyl groups. Specific examples of substituted silylene groups include, but are not limited to, dimethylsilylene, methylethylsilylene, and diethylsilylene groups.

In one or more embodiments, protecting groups suitable for use can be directly or indirectly bonded to each other to form a cyclic structure. For instance, two silyl atoms directly bonded to the protected primary amine can be bonded to each other via a linking alkylene or arylene group. As used herein, the term "alkylene" shall denote a divalent group formed by removing two hydrogen atoms from a hydrocarbon, the free valencies of which are not engaged in a double bond, and may include heteroatoms. As used herein, the term "arylene" shall denote a divalent group formed by removing two hydrogen atoms from a ring carbon in an arene (i.e., a mono- or polycyclic aromatic hydrocarbon), and may include heteroatoms. Linking alkylene and arylene groups suitable for use include any substituted or unsubstituted $C_1$ to $C_{20}$ alkylene or arylene groups. Additionally, alkylene groups suitable for use can be straight, branched, or cyclic, and can be saturated or unsaturated. In one or more embodiments, the linking groups can comprise a straight-chain $C_1$ to $C_{12}$ alkylene group. In still other embodiments, the linking group can be selected from the group consisting of 1,2-ethylene, 1,3-n-propylene, and 1,4-n-butylene.

As mentioned above, the polymerization initiator can comprise at least one metal. In various embodiments, the metal of the polymerization initiator is not located on any of the above-described protected primary amine groups. In one or more embodiments, the metal can be located at a position on the polymerization initiator that will be the site of initial polymerization when the polymerization initiator is employed in a polymerization reaction, such as those discussed below. Additionally, the metal can be located on a carbon atom, a silicon atom, a tin atom, or a nitrogen atom. In one or more embodiments, the metal can be positioned in place of the hydrogen atom on a secondary amine group in the polymerization initiator. As used herein, the term secondary amine group shall denote an amine group having only one hydrogen atom (i.e., $R_2$—NH).

The metal of the polymerization initiator can be selected from metals having a valency in the range of from 1 to 4, or in the range of from 1 to 2. Additionally, the metal of the initiator can comprise an alkali metal or an alkaline earth metal. Examples of suitable metals include, but are not limited to, lithium, sodium, potassium, magnesium, and calcium. In one or more embodiments, the metal of the polymerization initiator comprises lithium.

In one or more embodiments, the polymerization initiator can have the following structure:

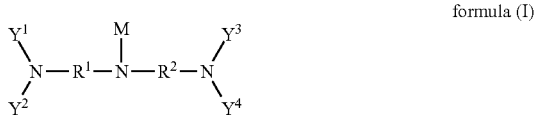

formula (I)

where $Y^1$, $Y^2$, $Y^3$, and $Y^4$ can independently be protecting groups, such as those discussed above. In one or more embodiments, each of $Y^1$, $Y^2$, $Y^3$, and $Y^4$ can be a substituted silyl group. Additionally, each of $Y^1$, $Y^2$, $Y^3$, and $Y^4$ can be a trialkyl substituted silyl group, such as those described above as suitable for use as protecting groups.

$R^1$ and $R^2$ of formula (I) can independently be any substituted or unsubstituted alkylene or arylene groups having a carbon number of from 0 to 20, and may include heteroatoms. Additionally, alkylene groups suitable for use as $R^1$ and $R^2$ can be straight, branched, or cyclic, and can be saturated or unsaturated. It should be noted that when $R^1$ and/or $R^2$ have a "0" carbon number, then such alkylene or arylene group is not actually present; thus, the corresponding adjacent nitrogen atoms would be directly bonded to each other. In one or more embodiments, $R^1$ and $R^2$ can independently be straight-chain $C_1$ to $C_{12}$ alkylene groups. Additionally, $R^1$ and $R^2$ can independently be saturated, unsubstituted, straight-chain $C_3$ to $C_9$ alkylene groups. Examples of suitable alkylene groups include, but are not limited to, methylene, ethylene, trimethylene, tetramethylene, pentamethylene, hexamethylene, heptamethylene, octamethylene, nonamethylene, decamethylene, and dodecamethylene groups. It should be noted that regardless of the composition and configuration of the $R^1$ and $R^2$ groups, the adjacent nitrogen atoms shown in formula (I) can be bonded to any terminal or non-terminal carbon atom present in the $R^1$ and $R^2$ groups. In one or more embodiments, the adjacent nitrogen atoms can be bonded to corresponding terminal carbon atoms of the $R^1$ and $R^2$ groups. Additionally, in various embodiments, $R^1$ and $R^2$ can comprise alkylene or arylene groups having like structures.

M in the above formula (I) can be any metal described above as being suitable for use in the polymerization initiator. For instance, M can be an alkali metal or an alkaline earth metal. In one or more embodiments, M can be lithium. Additionally, in formula (I), above, $Y^1$, $Y^2$, $Y^3$, $Y^4$, $R^1$, and/or $R^2$ may be directly or indirectly bonded to each other to form one or more cyclic structures.

In one or more embodiments, the polymerization initiator can have the following structure:

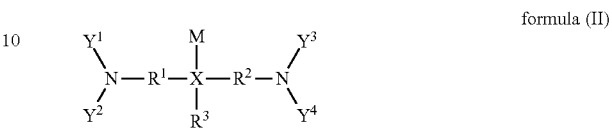

formula (II)

where $Y^1$, $Y^2$, $Y^3$, and $Y^4$ can independently be protecting groups, such as those discussed above. In one or more embodiments, each of $Y^1$, $Y^2$, $Y^3$, and $Y^4$ can be a substituted silyl group. Additionally, each of $Y^1$, $Y^2$, $Y^3$, and $Y^4$ can be a trialkyl substituted silyl group, such as those described above as suitable for use as protecting groups.

$R^1$ and $R^2$ of formula (II) can independently be any substituted or unsubstituted alkylene or arylene groups having a carbon number of from 0 to 20, and may include heteroatoms. Additionally, alkylene groups suitable for use as $R^1$ and $R^2$ can be straight, branched, or cyclic, and can be saturated or unsaturated. It should be noted that when $R^1$ and/or $R^2$ have a "0" carbon number, then such alkylene or arylene group is not actually present; thus, the corresponding adjacent nitrogen and X atoms would be directly bonded to each other. In one or more embodiments, $R^1$ and $R^2$ can independently be straight-chain $C_1$ to $C_{12}$ alkylene groups. Additionally, $R^1$ and $R^2$ can independently be saturated, unsubstituted, straight-chain $C_3$ to $C_9$ alkylene groups. Examples of suitable alkylene groups include, but are not limited to, methylene, ethylene, trimethylene, tetramethylene, pentamethylene, hexamethylene, heptamethylene, octamethylene, nonamethylene, decamethylene, and dodecamethylene groups. It should be noted that regardless of the composition and configuration of the $R^1$ and $R^2$ groups, the adjacent nitrogen and X atoms shown in formula (II) can be bonded to any terminal or non-terminal carbon atom present in the $R^1$ and $R^2$ groups. In one or more embodiments, the adjacent nitrogen and X atoms can be bonded to corresponding terminal carbon atoms of the $R^1$ and $R^2$ groups. Additionally, in various embodiments, $R^1$ and $R^2$ can comprise alkylene or arylene groups having like structures.

$R^3$ of formula (II) can be a hydrogen atom or any substituted or unsubstituted alkyl or aryl group having a carbon number of from 1 to 20. Additionally, alkyl groups suitable for use as $R^3$ can be straight, branched, or cyclic, and can be saturated or unsaturated. Alkyl groups suitable for use as $R^3$ include, but are not limited to, methyl, ethyl, n-propyl, isopropyl, n-butyl, isobutyl, sec-butyl, tert-butyl, pentyl, hexyl, octyl, decyl, dodecyl, cyclopentyl, cyclohexyl, vinyl, propenyl, allyl, hexenyl, octenyl, cyclopentenyl, and cyclohexenyl groups.

Furthermore, in various embodiments, $R^3$ can further be substituted with one or more protected primary amine groups, such as those discussed above. In such embodiments, the $R^3$ substituent can have a formula of: —$R^3$—$NY_2$, where $R^3$ can be any substituted or unsubstituted alkylene or arylene group having a carbon number of from 1 to 20, such as those described above as being suitable for use as either of $R^1$ or $R^2$ in formula (II), and each Y group can independently be any protecting group, such as those described above as being suitable for use as any of $Y^1$, $Y^2$, $Y^3$, or $Y^4$ in formula (II).

M in the above formula (II) can be any metal described above as being suitable for use in the polymerization initiator. For instance, M can be an alkali metal or an alkaline earth metal. In one or more embodiments, M can be lithium. X in the above formula (II) can be any atom having a valence of at least 4. In one or more embodiments, X can be selected from the group consisting of carbon, silicon, and tin. Additionally, in formula (II), above, $Y^1$, $Y^2$, $Y^3$, $Y^4$, $R^1$, $R^2$, and/or $R^3$ may be directly or indirectly bonded to each other to form one or more cyclic structures.

In one or more embodiments, the polymerization initiator can have the following structure:

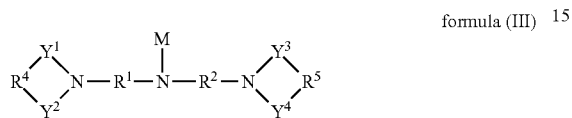

formula (III)

where $Y^1$, $Y^2$, $Y^3$, and $Y^4$ can independently be substituted or unsubstituted silylene groups. In one or more embodiments, $Y^1$, $Y^2$, $Y^3$, and $Y^4$ can be dialkyl substituted silylene groups. Suitable alkyl substituents for $Y^1$, $Y^2$, $Y^3$, and $Y^4$ include any $C_1$ to $C_{20}$, $C_1$ to $C_{12}$, or $C_1$ to $C_4$ straight, branched, or cyclic, substituted or unsubstituted, saturated or unsaturated alkyl groups. In one or more embodiments, alkyl substituents for $Y^1$, $Y^2$, $Y^3$, and $Y^4$ can be independently selected from $C_1$ to $C_4$ straight-chain, unsubstituted, saturated alkyl groups. In one or more embodiments, each of $Y^1$, $Y^2$, $Y^3$, and $Y^4$ can be a dimethylsilylene.

$R^1$ and $R^2$ of formula (III) can independently be any substituted or unsubstituted alkylene or arylene groups having a carbon number of from 0 to 20, and may include heteroatoms. Additionally, alkylene groups suitable for use as $R^1$ and $R^2$ can be straight, branched, or cyclic, and can be saturated or unsaturated. It should be noted that when $R^1$ and/or $R^2$ have a "0" carbon number, then such alkylene or arylene group is not actually present; thus, the corresponding adjacent nitrogen atoms would be directly bonded to each other. In one or more embodiments, $R^1$ and $R^2$ can independently be straight-chain $C_1$ to $C_{12}$ alkylene groups. Additionally, $R^1$ and $R^2$ can independently be saturated, unsubstituted, straight-chain $C_3$ to $C_9$ alkylene groups. Examples of suitable alkylene groups include, but are not limited to, methylene, ethylene, trimethylene, tetramethylene, pentamethylene, hexamethylene, heptamethylene, octamethylene, nonamethylene, decamethylene, and dodecamethylene groups. It should be noted that regardless of the composition and configuration of the $R^1$ and $R^2$ groups, the adjacent nitrogen atoms shown in formula (III) can be bonded to any terminal or non-terminal carbon atom present in the $R^1$ and $R^2$ groups. In one or more embodiments, the adjacent nitrogen atoms can be bonded to corresponding terminal carbon atoms of the $R^1$ and $R^2$ groups. Additionally, in various embodiments, $R^1$ and $R^2$ can comprise alkylene or arylene groups having like structures.

$R^4$ and $R^5$ of formula (III) can independently be any substituted or unsubstituted alkylene or arylene groups having a carbon number of from 1 to 20, and may include heteroatoms. Additionally, alkylene groups suitable for use as $R^4$ and $R^5$ can be straight, branched, or cyclic, and can be saturated or unsaturated. In one or more embodiments, $R^4$ and $R^5$ can independently be straight-chain $C_1$ to $C_{12}$ alkylene groups. In one or more embodiments, $R^4$ and $R^5$ can independently be selected from the group consisting of 1,2-ethylene, 1,3-n-propylene, and 1,4-n-butylene. It should be noted that regardless of the composition and configuration of the $R^4$ and $R^5$ groups, the adjacent Y groups shown in formula (III) can be bonded to any terminal or non-terminal carbon atom present in the $R^4$ and $R^5$ groups. In one or more embodiments, the adjacent Y groups can be bonded to corresponding terminal carbon atoms of the $R^4$ and $R^5$ groups. Additionally, in various embodiments, $R^4$ and $R^5$ can comprise alkylene or arylene groups having like structures.

M in the above formula (III) can be any metal described above as being suitable for use in the polymerization initiator. For instance, M can be an alkali metal or an alkaline earth metal. In one or more embodiments, M can be lithium.

In one or more embodiments, the polymerization initiator can have the following structure:

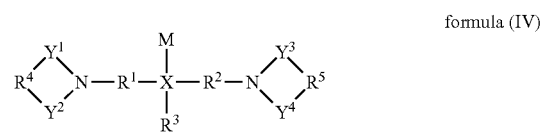

formula (IV)

where $Y^1$, $Y^2$, $Y^3$, and $Y^4$ can independently be substituted or unsubstituted silylene groups. In one or more embodiments, $Y^1$, $Y^2$, $Y^3$, and $Y^4$ can be dialkyl substituted silylene groups. Suitable alkyl substituents for $Y^1$, $Y^2$, $Y^3$, and $Y^4$ include any $C_1$ to $C_{20}$, $C_1$ to $C_{12}$, or $C_1$ to $C_4$ straight or branched, substituted or unsubstituted, saturated or unsaturated alkyl groups. In one or more embodiments, alkyl substituents for $Y^1$, $Y^2$, $Y^3$, and $Y^4$ can be independently selected from $C_1$ to $C_4$ straight-chain, unsubstituted, saturated alkyl groups. In one or more embodiments, each of $Y^1$, $Y^2$, $Y^3$, and $Y^4$ can be a dimethylsilylene.

$R^1$ and $R^2$ of formula (IV) can independently be any substituted or unsubstituted alkylene or arylene groups having a carbon number of from 0 to 20, and may include heteroatoms. Additionally, alkylene groups suitable for use as $R^1$ and $R^2$ can be straight, branched, or cyclic, and can be saturated or unsaturated. It should be noted that when $R^1$ and/or $R^2$ have a "0" carbon number, then such alkylene or arylene group is not actually present; thus, the corresponding adjacent nitrogen and X atoms would be directly bonded to each other. In one or more embodiments, $R^1$ and $R^2$ can independently be straight-chain $C_1$ to $C_{12}$ alkylene groups. Additionally, $R^1$ and $R^2$ can independently be saturated, unsubstituted, straight-chain $C_3$ to $C_9$ alkylene groups. Examples of suitable alkylene groups include, but are not limited to, methylene, ethylene, trimethylene, tetramethylene, pentamethylene, hexamethylene, heptamethylene, octamethylene, nonamethylene, decamethylene, and dodecamethylene groups. It should be noted that regardless of the composition and configuration of the $R^1$ and $R^2$ groups, the adjacent nitrogen and X atoms shown in formula (IV) can be bonded to any terminal or non-terminal carbon atom present in the $R^1$ and $R^2$ groups. In one or more embodiments, the adjacent nitrogen and X atoms can be bonded to corresponding terminal carbon atoms of the $R^1$ and $R^2$ groups. Additionally, in various embodiments, $R^1$ and $R^2$ can comprise alkylene or arylene groups having like structures.

$R^3$ of formula (IV) can be a hydrogen atom or any substituted or unsubstituted alkyl or aryl group having a carbon number of from 1 to 20. Additionally, alkyl groups suitable for use as $R^3$ can be straight, branched, or cyclic, and can be saturated or unsaturated. Alkyl groups suitable for use as $R^3$ include, but are not limited to, methyl, ethyl, n-propyl, isopropyl, n-butyl, isobutyl, sec-butyl, tert-butyl, pentyl, hexyl, octyl, decyl, dodecyl, cyclopentyl, cyclohexyl, vinyl, propenyl, allyl, hexenyl, octenyl, cyclopentenyl, and cyclohexenyl groups.

Furthermore, in various embodiments, $R^3$ can further be substituted with one or more protected primary amine groups, such as those discussed above. In such embodiments, the $R^3$ substituent can have a formula of: $-R^3-NY_2$, where $R^3$ can be any substituted or unsubstituted alkylene or arylene group having a carbon number of from 1 to 20, such as those described above as being suitable for use as either of $R^1$ or $R^2$ in formula (IV), and each Y group can independently be any protecting group, such as those described above as being suitable for use as any of $Y^1$, $Y^2$, $Y^3$, or $Y^4$ in formula (IV).

$R^4$ and $R^5$ of formula (IV) can independently be any substituted or unsubstituted alkylene or arylene groups having a carbon number of from 1 to 20, and may include heteroatoms. Additionally, alkylene groups suitable for use as $R^4$ and $R^5$ can be straight, branched, or cyclic, and can be saturated or unsaturated. In one or more embodiments, $R^4$ and $R^5$ can independently be straight-chain $C_1$ to $C_{12}$ alkylene groups. In one or more embodiments, $R^4$ and $R^5$ can independently be selected from the group consisting of 1,2-ethylene, 1,3-n-propylene, and 1,4-n-butylene. It should be noted that regardless of the composition and configuration of the $R^4$ and $R^5$ groups, the adjacent Y groups shown in formula (IV) can be bonded to any terminal or non-terminal carbon atom present in the $R^4$ and $R^5$ groups. In one or more embodiments, the adjacent Y groups can be bonded to corresponding terminal carbon atoms of the $R^4$ and $R^5$ groups. Additionally, in various embodiments, $R^4$ and $R^5$ can comprise alkylene or arylene groups having like structures.

M in the above formula (IV) can be any metal described above as being suitable for use in the polymerization initiator. For instance, M can be an alkali metal or an alkaline earth metal. In one or more embodiments, M can be lithium. Additionally, X in the above formula (IV) can be any atom having a valence of at least 4. In one or more embodiments, X can be selected from the group consisting of carbon, silicon, and tin.

Specific examples of polymerization initiators that are suitable for use in one or more embodiments include, but are not limited to, silylated bis(hexamethylene)triamine-lithium silylated N-(3-aminopropyl)-1,3-propanediamine-lithium, silylated bis(tetramethylene)triamine-lithium, silylated bis(pentamethylene)triamine-lithium, silylated bis(heptamethylene)triamine-lithium, silylated bis(octamethylene)triamine-lithium, silylated bis(nonamethylene)triamine-lithium, silylated 1,8-diamino-4-azaoctane-lithium, silylated 1,9-diamino-4-azanonane-lithium, silylated 1,10-diamino-4-azadecane-lithium, silylated 1,10-diamino-5-azadecane-lithium, silylated 1,11-diamino-4-azaundecane-lithium, silylated 1,11-diamino-5-azaundecane-lithium, silylated 1,12-diamino-4-azadodecane-lithium, silylated 1,12-diamino-5-azadodecane-lithium, silylated 1,12-diamino-6-azadodecane-lithium, silylated 1,13-diamino-4-azamidecane-lithium, silylated 1,13-diamino-5-azamidecane-lithium, silylated 1,13-diamino-6-azamidecane-lithium, silylated 4,4'-diamino-diphenylamine-lithium, silylated 4,4'-di(aminomethyl)-diphenylamine-lithium, silylated 4,4'-di(aminoethyl)-diphenylamine-lithium, and silylated 4,4'-diamino-dicyclohexylamine-lithium. In one or more embodiments, the polymerization initiator comprises silylated bis(hexamethylene)triamine-lithium.

The above-described polymerization initiator can be prepared by any methods known or hereafter discovered in the art. In one or more embodiments, the above-described polymerization initiator can be prepared by initially combining a polymerization initiator precursor with a silylating agent to form a silylated polymerization initiator precursor. In one or more embodiments, the resulting silylated polymerization initiator precursor can comprise at least two protected primary amine groups. Thereafter, the silylated polymerization initiator precursor can be combined with a metal donor to form the above-described polymerization initiator.

In one or more embodiments, the above-mentioned polymerization initiator precursor can comprise a compound having at least two primary amine groups. Additionally, the polymerization initiator precursor can also comprise at least one secondary or tertiary amine group. In various embodiments, the polymerization initiator precursor can have at least one of the following structures:

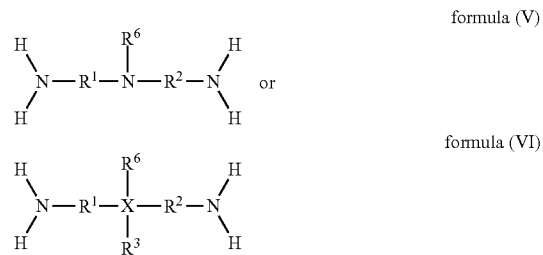

where $R^1$, $R^2$, $R^3$, and X can each be the same as described above with reference to formulas (I) through (IV), two or more of which can be directly or indirectly bonded together to form one or more cyclic structures. $R^6$ in formulas (V) and (VI) can be a hydrogen atom or any substituted or unsubstituted alkyl or aryl group having a carbon number of from 1 to 20. Additionally, alkyl groups suitable for use as $R^6$ can be straight, branched, or cyclic, and can be saturated or unsaturated. Alkyl groups suitable for use as $R^6$ include, but are not limited to, methyl, ethyl, n-propyl, isopropyl, n-butyl, isobutyl, sec-butyl, tert-butyl, pentyl, hexyl, octyl, decyl, dodecyl, cyclopentyl, cyclohexyl, vinyl, propenyl, allyl, hexenyl, octenyl, cyclopentenyl, and cyclohexenyl groups. In one or more embodiments, $R^6$ can be a hydrogen atom.

Specific examples of polymerization initiator precursors that are suitable for use in one or more embodiments include, but are not limited to, bis(hexamethylene)triamine, N-(3-aminopropyl)-1,3-propanediamine, bis(tetramethylene)triamine, bis(pentamethylene)triamine, bis(heptamethylene)triamine, bis(octamethylene)triamine, bis(nonamethylene)triamine, 1,8-diamino-4-azaoctane, 1,9-diamino-4-azanonane, 1,10-diamino-4-azadecane, 1,10-diamino-5-azadecane, 1,11-diamino-4-azaundecane, 1,11-diamino-5-azaundecane, 1,12-diamino-4-azadodecane, 1,12-diamino-5-azadodecane, 1,12-diamino-6-azadodecane, 1,13-diamino-4-azamidecane, 1,13-diamino-5-azamidecane, 1,13-diamino-6-azamidecane, 4,4'-diamino-diphenylamine, 4,4'-di(aminomethyl)-diphenylamine, 4,4'-di(aminoethyl)-diphenylamine, and 4,4'-diamino-dicyclohexylamine. In one or more embodiments, the polymerization initiator precursor comprises bis(hexamethylene)triamine.

The above-mentioned silylating agent can be any silyl-containing compound capable of reacting with the above-described polymerization initiator precursor to place one or more substituted or unsubstituted silyl groups on the polymerization initiator precursor. In one or more embodiments, the silylating agent can be capable of reacting with the polymerization initiator precursor to place one or more substituted or unsubstituted silyl groups on the primary amine groups of the polymerization initiator precursor. In various embodiments, the silylating agent can have the following structure:

$$Y^5\text{-}A^1 \qquad \text{formula (VII)}$$

or $$A^1\text{-}Y^5\text{—}R^7\text{—}Y^6\text{-}A^2 \qquad \text{formula (VIII)}$$

where $Y^5$ and $Y^6$ can each be the same as described above with reference to any of $Y^1$, $Y^2$, $Y^3$, or $Y^4$ of formulas (I) through (IV). In one or more embodiments, $Y^5$ of formula (VII) can be an alkyl substituted silyl group, and each of $Y^5$ and $Y^6$ of formula (VIII) can be an alkyl substituted silylene group. Each of $A^1$ and $A^2$ can independently be a halogen atom, a thioalkyl group having a carbon number of from 1 to 20, a cyano group, or a trifluoromethylsulfonyl group. In one or more embodiments, $A^1$ and $A^2$ can be halogen atoms, such as chlorine. $R^7$ of formula (VIII) can be any substituted or unsubstituted alkylene or arylene group having a carbon number of from 1 to 20, and may include heteroatoms. Additionally, alkylene groups suitable for use as $R^7$ can be straight, branched, or cyclic, and can be saturated or unsaturated. In one or more embodiments, $R^7$ can be a straight-chain $C_1$ to $C_{12}$ alkylene group. Examples of suitable alkylene groups include, but are not limited to, methylene, ethylene, trimethylene, tetramethylene, pentamethylene, hexamethylene, heptamethylene, octamethylene, nonamethylene, decamethylene, and dodecamethylene groups.

Specific examples of silylating agents that are suitable for use in one or more embodiments include, but are not limited to, chlorotrimethyl silane, chlorotriethyl silane, chloromethyldiethyl silane, chlorodimethylethyl silane, chlorotriisopropyl silane, chlorodimethylisopropyl silane, diethylisopropylsilyl chloride, tert-butyldimethylsilyl chloride, 1,2-bis (chlorodimethylsilyl)ethane, chlorotriphenyl silane, tert-butyldiphenylsilyl chloride, 1,3-bis(chlorodimethylsilyl) propane, 1,4-bis(chlorodimethylsilyl)butane, and 1,2-bis (chlorodimethylsilyl)benzene. In one or more embodiments, the silylating agent comprises 1,2-bis(chlorodimethylsilyl) ethane, 1,3-bis(chlorodimethylsilyl)propane, 1,4-bis(chlorodimethylsilyl)butane, 1,2-bis(chlorodimethylsilyl)benzene, or mixtures thereof.

As mentioned above, a metal donor can be combined with the silylated polymerization initiator precursor. The metal donor can be an organic alkali metal compound or an organic alkaline earth metal compound. In one or more embodiments, the metal donor can be an organolithium compound. Suitable organolithium compounds include, but are not limited to, ethyllithium, n-propyllithium, isopropyllithium, n-butyllithium, sec-butyllithium, tert-octyllithium, n-decyllithium, phenyllithium, 2-naphthyllithium, 2-butyl-phenyllithium, 4-phenyl-butyllithium, cyclohexyllithium, and cyclopentyllithium. In one or more embodiments, the metal donor can be selected from the group consisting of ethyllithium, n-propyllithium, isopropyllithium, n-butyllithium, sec-butyllithium, tert-octyllithium, n-decyllithium, and mixtures thereof. In various embodiments, the metal donor comprises n-butyllithium.

In one or more embodiments, the above-described polymerization initiator can be prepared by first combining the above-described polymerization initiator precursor with the above-described silylating agent to form a silylated polymerization initiator precursor. In one or more embodiments, at least 0.5, at least 0.7, or at least 1.0 mol of silyl groups on the silylating agent per 1 mol of active primary amine proton (i.e., hydrogen atom) included in the polymerization initiator precursor can be employed in this initial step. Also, this initial step can optionally be carried out in the presence of at least a portion of the metal donor. In one or more embodiments, at least 0.5, at least 0.7, or at least 1.0 mol of the metal donor per 1 mol of the polymerization initiator precursor can be employed.

In the second step, the silylated polymerization initiator precursor can be combined with the aforementioned metal donor to form the above-described polymerization initiator. Additionally, when the metal donor is employed in the initial step, the metal donor used in the second step may be the same as or different from ones used in the initial step. In one or more embodiments, at least 0.5, at least 0.7, or at least 1.0 mol of the metal donor can be used per 1 mol of the silylated polymerization initiator precursor.

Both the initial and second steps of the above-described procedure can be carried out in the presence of various solvents and/or reagents. Examples of such solvents and/or reagents suitable for use in the above-described process include, but are not limited to, hexane, dichloromethane, cyclohexane, benzene, toluene, and diethyl ether. Additionally, the polymerization initiator can be prepared in the presence of one or more Lewis bases. Such Lewis bases include, but are not limited to, ether compounds, such as tetrahydrofuran or 2,2-di(tetrahydrofuryl)propane, and trialkylamine compounds, such as triethylamine or N,N,N',N'-tetramethylethylenediamine. The preparation of the polymerization initiator can be carried out in an atmosphere of an inert gas such as nitrogen, argon, or the like, at a temperature in the range of from about −20 to about 80° C. In one or more embodiments, preparation of the initiator can be carried out at room temperature.

As mentioned above, the above-described polymerization initiator can be employed to produce a polymer that comprises at least one monomer residue derived from the polymerization initiator. As used herein, the term "residue" shall denote the remaining portion of a molecule that has been incorporated into a larger molecular structure, such as, for example, by polymerization or crosslinking.

The contemplated polymers can be any polymers comprising at least one monomer residue derived from the above-described polymerization initiator. In one or more embodiments, the polymerization initiator residue can be located at the starting terminal monomer of the polymer. Additionally, the starting terminal monomer residue can comprise at least two protected or unprotected pendant primary amine groups. In one or more embodiments, the starting terminal monomer of the polymer comprises at least two unprotected primary amine groups. Additionally, the polymer can comprise one or more unsaturated C—C bonds.

In one or more embodiments, the polymer can comprise a plurality of residues derived from a conjugated diene monomer. As such, in one or more embodiments, the polymer can be a homopolymer of a conjugated diene monomer. Examples of suitable conjugated diene monomers include, but are not limited to, 1,3-butadiene, isoprene, 1,3-pentadiene, 2,3-dimethylbutadiene, 2-phenyl-1,3-butadiene, and 1,3-hexadiene. In one or more embodiments, the conjugated diene monomer comprises 1,3-butadiene and/or isoprene. In addition, the polymer can comprise a plurality of residues derived from an aromatic vinyl monomer. As such, the polymer can be a copolymer of conjugated diene monomers and aromatic vinyl monomers. Examples of suitable aromatic vinyl monomers include, but are not limited to, styrene, α-methylstyrene, 1-vinylnaphthalene, 3-vinyltoluene, ethylvinylbenzene, divinylbenzene, 4-cyclohexylstyrene, 2,4,6,-trimethylstyrene, 2-vinylpyridine, and 4-vinylpyridine. In one or more embodiments, the aromatic vinyl monomer comprises styrene. Additionally, in one or more embodiments, the polymer comprises a styrene-butadiene copolymer.

The polymer prepared employing the above-described polymerization initiator can have at least one of the following structures:

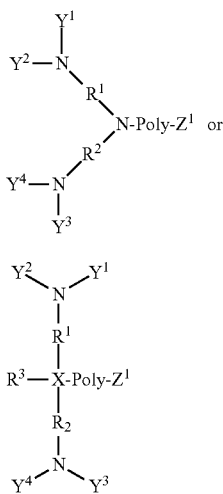

formula (IX)

formula (X)

where $R^1$, $R^2$, $R^3$, $Y^1$, $Y^2$, $Y^3$, $Y^4$, and X can all be the same as described above with reference to $R^1$, $R^2$, $R^3$, $Y^1$, $Y^2$, $Y^3$, $Y^4$, and X of formulas (I) through (IV). Additionally, any of $R^1$, $R^2$, $R^3$, $Y^1$, $Y^2$, $Y^3$, and/or $Y^4$ can be directly or indirectly bonded to each other to form one or more cyclic structures.

In the structures of formulas (IX) and (X), Poly can be a polymer comprising a plurality of residues derived from a conjugated diene monomer and/or an aromatic vinyl monomer. In one or more embodiments, Poly can be a homopolymer of a conjugated diene monomer. In other embodiments, Poly can be a copolymer of a conjugated diene monomer and an aromatic vinyl monomer. Suitable conjugated diene and aromatic vinyl monomers include those described above (e.g., 1,3-butadiene, isoprene, styrene, etc.). In various embodiments, Poly comprises a styrene-butadiene copolymer. In the structures of formulas (IX) and (X), $Z^1$ can comprise an alkali metal or an alkaline earth metal, such as those described above as being suitable for use in the polymerization initiator, or a residue of a polymerization terminator and/or modifier, such as those described below.

The polymer prepared employing the above-described polymerization initiator can have a Mooney viscosity ($ML_{1+4}$, 100° C.) in the range of from about 5 to about 100 MU, or in the range of from 10 to 80 MU. Additionally, the polymer can have a number average molecular weight (Mn) in the range of from about 5,000 to about 500,000 g/mol, or in the range of from 25,000 to 250,000 g/mol.

The above-described polymer can be prepared employing any polymerization methods known or hereafter discovered in the art. For example, a first polymerization method is contemplated where the above-described polymerization initiator is initially prepared and then combined with one or more types of monomers, such as those described above. In alternate embodiments, a second polymerization method can be employed where a small portion of one or more types of monomers are added to the previously prepared polymerization initiator thereby forming an oligomer, which can thereafter be added to the remaining portion of the monomer. In still other embodiments, a third method can be employed where the polymerization initiator is formed in situ while present with one or more types of monomers in a polymerization system. Regardless of which method is employed, the amount of the polymerization initiator used can be in the range of from about 0.2 to about 20 mmol per 100 g of monomer.

In the second polymerization method mentioned above, the polymerization initiator prepared as previously mentioned can be added to a solution comprising one or more types of monomers to form a low molecular weight polymer (i.e., an oligomer) represented by either of the following structures:

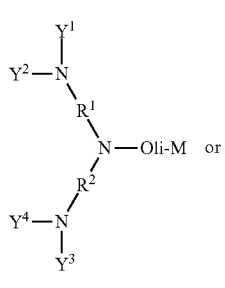

formula (XI)

formula (XII)

where $R^1$, $R^2$, $R^3$, $Y^1$, $Y^2$, $Y^3$, $Y^4$, and X can each be the same as described above with reference to the structures of formulas (IX) and (X), M can be the same as described above with reference to the structures of formulas (I) through (IV), and Oli represents an oligomer having in the range of from about 3 to about 300 repeating residue units. Additionally, any of $R^1$, $R^2$, $R^3$, $Y^1$, $Y^2$, $Y^3$, and/or $Y^4$ can be directly or indirectly bonded to one another to form one or more cyclic structures. The resulting oligomer can then be added to a solution including one or more types of monomers, as discussed above, to obtain a polymer.

In the third polymerization method mentioned above, the silylated compound formed in the initial step in preparing the polymerization initiator (i.e., the silylated polymerization initiator precursor, discussed above) can be added to a solution containing one or more types of monomers along with the above-described metal donor to obtain a polymer. The metal donor and the silylated polymerization initiator precursor can be substantially as described above with reference to preparation methods contemplated for the polymerization initiator.

The polymer, as described above, can be produced by any of solution polymerization, vapor phase polymerization, or bulk polymerization. In one or more embodiments, the polymer can be prepared by solution polymerization. Additionally, in one or more embodiments, the polymer can be prepared via living anionic polymerization. When the polymer is produced by solution polymerization, the monomer can be polymerized, for example, in a hydrocarbon solvent that is substantially inactive to the polymerization reaction. Examples of hydrocarbon solvents suitable for use include, but are not limited to, propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene, and mixtures thereof. In one or more embodiments, hexane can be employed as a solvent during polymerization.

The production of the above-described polymer may also be carried out in the presence of a randomizer. The randomizer can control the microstructure of the resulting polymer, and can affect the vinyl content (i.e., conjugated diene residues in the 1,2- or 3,4-addition configuration) of the resulting polymer. The randomizer can be added at any arbitrary stage of the polymerization. Examples of suitable randomizers include, but are not limited to, dimethoxybenzene, tetrahydrofuran, dimethoxyethane, diethylene glycol dibutyl ether, diethylene glycol dimethyl ether, ditetrahydrofuryl propane, triethylamine, pyridine, N-methylmorpholine, N,N,N',N'-tetramethylethylenediamine, 1,2-dipiperidinoethane, potassium-tert-amylate, potassium-tert-butoxide, sodium-tert-amylate, and mixtures thereof. The amount of randomizer employed can be in the range of from about 0.01 to about 100 mol per 1 mol of the polymerization initiator employed.

When the above-described polymer is produced by solution polymerization, the concentration of monomer in the solution can be in the range of from about 5 to about 50 percent by weight, or in the range of from 10 to 30 percent by weight, based on the total weight of the polymerization system. Moreover, when a conjugated diene monomer and an aromatic vinyl monomer are both employed during polymerization, the content of the aromatic vinyl compound in the monomer mixture can be in the range of from about 3 to about 50 percent by weight, or in the range of from 4 to 45 percent by weight. Also, the polymerization system may be a batch system or a continuous system.

During production of the above-described polymer, the polymerization temperature can be in the range of from about 0 to about 150° C., or in the range of from 20 to 130° C. Also, the polymerization may be carried out under a generating pressure, but can also be conducted under a pressure that is merely enough to keep the monomer used in substantially a liquid phase. When the polymerization reaction is carried out under a pressure higher than the generating pressure, the reaction system can be pressurized with an inert gas. Further, the starting materials used in the polymerization, such as monomer, polymerization initiator, and solvent, can be employed after reaction obstructing substances, such as water, oxygen, carbon dioxide, and protonic compounds, are removed.

When a living polymerization technique is employed, a living polymer can be obtained having a functional group derived from the polymerization initiator located at its starting terminal monomer residue and a polymerizably active terminal on the opposing terminal end (i.e., a polymer where $Z^1$ of formulas (IX) or (X) is an alkali metal or an alkaline earth metal). In one or more embodiments, the polymerizably active terminal can simply be deactivated by a terminator at a desired stopping point. For instance, a polymerization terminator can be added to the polymerization system. Examples of suitable polymerization terminators include, but are not limited to, water or other compounds containing an active proton, such as alcohol compounds. When such polymerization terminators are employed, the resulting ending terminal monomer residue can be a hydrogen atom. Alternatively, the polymerizably active terminal can be modified with a modifying agent to obtain a polymer having a modified ending terminal monomer residue having one or more desired functional groups. For example, a carbanion reactive compound can be used as a modifying agent that contains one or more desired functional groups. In such a case, a polymer can be obtained where $Z^1$ of formulas (IX) or (X) is a residue produced by reacting the polymerizably active terminal of the polymer with a carbanion reactive compound.

The carbanion reactive compound can be a compound including at least one of C=B (where B represents an O, S, or C atom) or an epoxy group as a carbanion reaction site, along with a nitrogen-containing functional group, a silicon-containing compound, and/or a tin-containing compound. Specific examples of carbanion reactive compounds having at least one of C=B or an epoxy group, and a nitrogen-containing functional group include, but are not limited to, 4-dimethylamino benzophenone, 4-diethylamino benzophenone, 4,4'-bis(dimethylamino)benzophenone, 4,4'-bis(diethylamino)benzophenone, 4-dimethylamino benzaldehyde, 4-diethylamino benzaldehyde, 1,1-bis(4-dimethylaminophenyl)ethylene, 1,1-bis(4-diethylaminophenyl)ethylene, 1,1-dimethoxy trimethylamine, 4-dimethylaminobenzilidene aniline, N,N-dimethylformamide, N,N-diethylformamide, N,N-dimethylacetoamide, N,N-diethylacetoamide, 4-pyridylamide, 4-pyridyl-ethyleneoxide, 4-vinylpyridine, 2-vinylpyridine, dicyclohexylcarbodiimide, ε-Caprolactam, N-methyl-ε-caprolactam, 1,3-dimethyl-2-imidazolidinone, N-methylpyrrolidone, phenylisocyanate, phenylthioisocyanate, diisocyanate, and phenylmethane. In one or more embodiments, the modifying agent can be selected from the group consisting of 4,4'-bis(dimethylamino)benzophenone, 4-vinylpyridine, 1,3-dimethyl-2-imidazolidinone, and mixtures thereof.

As mentioned above, the modifying agent (i.e., the carbanion reactive compound) can alternatively comprise a silicon-containing compound and/or a tin-containing compound. In one or more embodiments, such modifying agents can have the formula:

formula (XIII)

where $R^8$ is selected from the group consisting of an alkyl group having a carbon number of from 1 to 20, a cycloalkyl group having a carbon number of from 3 to 20, an aryl group having a carbon number of from 6 to 20, and an aralkyl group having a carbon number of from 7 to 20; where $Z^2$ can be a tin or silicon atom; where $X^2$ can be a chlorine or bromine atom; and where a is an integer of from 0 to 3 and b is an integer of from 1 to 4, with the proviso that a+b=4. Examples of suitable modifying agents having the structure of formula (XIII) include, but are not limited to, tin tetrachloride, $R^8SnCl_3$, $R^8_2SnCl_2$, and $R^8_3SnCl$. In one or more embodiments, the modifying agent comprises tin tetrachloride.

In one or more embodiments, the modifying agent can comprise a silicon-containing compound having the following alkoxy silane structure:

formula (XIV)

where $A^3$ can be a monovalent group having at least one functional group selected from the group consisting of (thio)epoxy, (thio)isocyanate, (thio)ketone, (thio)aldehyde, imine, amide, isocyanuric acid triester, (thio)carboxylic acid alkylester, a metal salt of (thio)carboxylic acid, carboxylic anhydride, a halide of carboxylic acid, carbonic acid dialkylester, cyclic tertiary amine, non-cyclic tertiary amine, nitrile, pyridine, sulfide, poly-sulfide, an alkali metal salt of amine, an alkaline earth metal salt of amine, silazane, and disilazane groups; $R^9$ can be a single bond or a divalent inactive alkylene group; $R^{10}$ and $R^{11}$ can independently be alkyl groups having carbon numbers of from 1 to 20 or aryl groups having carbon numbers of from 6 to 18; n can be an integer of from 0 to 2; when n is greater than 1, the $OR^{11}$ groups may be the same as or different from one another; and an active proton and onium salt are not included in the molecule.

In the functional group $A^3$ of the formula (XIV), the imine can include ketimine, aldimine, and amidine; the (thio)carboxylic acid ester can include an ester of an unsaturated carboxylic acid, such as acrylate or methacrylate; the noncyclic tertiary amine includes N,N-disubstituted aromatic amines, such as N,N-disubstituted aniline; and the cyclic tertiary amine can include (thio)ether as a part of a ring. As the metal of a metal salt of (thio)carboxylic acid, alkali metals, alkaline earth metals, Al, Sn, or Zn can be employed. Further, the functional group in $A^3$ can be an alkali metal salt of an amine, an alkaline earth metal salt of an amine, silazane, or disilazane.

As the divalent inert alkylene group, $R^9$ can comprise an alkylene group having a carbon number of from 1 to 20. The alkylene group may be straight, branched, or cyclic, and can be saturated or unsaturated. In one or more embodiments, the alkylene group of $R^9$ can be a straight chain. Examples of alkylene groups suitable for use as $R^9$ include, but are not limited to, methylene, ethylene, trimethylene, tetramethylene, pentamethylene, hexamethylene, octamethylene, decamethylene, and dodecamethylene groups.

$R^{10}$ and $R^{11}$ of formula (XIV) can independently comprise alkyl groups having carbon numbers of from 1 to 20, alkenyl groups having carbon numbers of from 2 to 20, aryl groups having carbon numbers of from 6 to 18, and/or aralkyl groups having carbon numbers of from 7 to 18. The alkyl groups and alkenyl groups may be straight, branched, or cyclic, and include, for example, methyl, ethyl, n-propyl, isopropyl, n-butyl, isobutyl, sec-butyl, tert-butyl, pentyl, hexyl, octyl, decyl, dodecyl, cyclopentyl, cyclohexyl, vinyl, propenyl, allyl, hexenyl, octenyl, cyclopentenyl, and cyclohexenyl groups. Also, aryl groups, if present, may have a substituent on the aromatic ring, such as lower alkyl group, and include, for example, phenyl, tolyl, xylyl, and naphthyl groups. Further, the aralkyl groups, if present, may have a substituent on the aromatic ring, such as a lower alkyl group, and includes, for example, benzyl, phenetyl, and naphthylmethyl groups.

In the alkoxy silane compound of formula (XIV), examples of alkoxy silane compounds having a (thio)epoxy group include, but are not limited to, 2-glycidoxyethyl trimethoxysilane, 2-glycidoxyethyl triethoxysilane, (2-glycidoxyethyl)methyl dimethoxysilane, 3-glycidoxypropyl trimethoxysilane, 3-glycidoxypropyl triethoxysilane, (3-glycidoxypropyl)methyl dimethoxysilane, 2-(3,4-epoxycyclohexyl)ethyl trimethoxysilane, 2-(3,4-epoxycyclohexyl)ethyl triethoxysilane, 2-(3,4-epoxycyclohexyl)ethyl(methyl) dimethoxysilane, and compounds obtained by replacing the epoxy group in these compounds with a thioepoxy group. In one or more embodiments, the above-mentioned modifying agent can comprise 3-glycidoxypropyl trimethoxysilane and/or 3-glycidoxypropyl triethoxysilane.

Examples of imine group-containing alkoxy silane compounds having the structure of formula (XIV) include, but are not limited to, N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-diethylaminobenzylidene)-3-(triethoxysilyl)-1-propaneamine, N-(cyclohexylidene)-3-(triethoxysilyl)-1-propaneamine, as well as trimethoxysilyl compounds, methyldimethoxysilyl compounds, ethyldiethoxysilyl compounds, methyldimethoxysilyl compounds, and ethyldimethoxysilyl compounds corresponding to these triethoxysilyl compounds. In one or more embodiments, the above-mentioned modifying agent can comprise N-(1-methylpropylidene)-3-(triethoxysilyl)-1-propaneamine and/or N-(1,3-dimethylbutylidene)-3-(triethoxysilyl)-1-propaneamine.

Examples of imine(amidine) group-containing alkoxy silane compounds having the structure of formula (XIV) include, but are not limited to, 1-[3-(triethoxysilyl)propyl]-4,5-dihydroimidazole, 1-[3-(trimethoxysilyl)propyl]-4,5-dihydroimidazole, N-(3-triethoxysilylpropyl)-4,5-dihydroimidazole, N-(3-isopropoxysilylpropyl)-4,5-dihydroimidazole, and N-(3-methyldiethoxysilylpropyl)-4,5-dihydroimidazole. In one or more embodiments, the above-mentioned modifying agent can comprise N-(3-triethoxysilylpropyl)-4,5-dihydroimidazole.

Examples of carboxylic acid ester group-containing alkoxy silane compounds having the structure of formula (XIV) include, but are not limited to, 3-methacryloyloxypropyl triethoxysilane, 3-methacryloyloxypropyl trimethoxysilane, 3-methacryloyloxypropyl methyldiethoxysilane, and 3-methacryloyloxypropyl triisopropoxysilane. In one or more embodiments, the above-mentioned modifying agent can comprise 3-methacryloyloxypropyl trimethoxysilane.

Examples of isocyanate group-containing alkoxy silane compounds having the structure of formula (XIV) include, but are not limited to, 3-isocyanatopropyl trimethoxysilane, 3-isocyanatopropyl triethoxysilane, 3-isocyanatopropyl methyldiethoxysilane, and 3-isocyanatopropyl triisopropoxysilane. In one or more embodiments, the above-mentioned modifying agent can comprise 3-isocyanatopropyl triethoxysilane.

Examples of carboxylic anhydride group-containing alkoxy silane compounds having the structure of formula (XIV) include, but are not limited to, 3-triethoxysilylpropyl succinic acid anhydride, 3-trimethoxysilylpropyl succinic acid anhydride, and 3-methyldiethoxysilylpropyl succinic acid anhydride. In one or more embodiments, the above-mentioned modifying agent can comprise 3-triethoxysilylpropyl succinic acid anhydride.

Examples of alkoxy silane compounds having a cyclic tertiary amine group and the structure of formula (XIV) include, but are not limited to, 3-(1-hexamethyleneimino)propyl(triethoxy) silane, 3-(1-hexamethyleneimino)propyl(trimethoxy) silane, (1-hexamethyleneimino)methyl(trimethoxy) silane, (1-hexamethyleneimino)methyl(triethoxy) silane, 2-(1-hexamethyleneimino)ethyl(triethoxy) silane, 2-(1-hexamethyleneimino)ethyl(trimethoxy) silane, 3-(1-pyrrolidynyl)propyl(triethoxy) silane, 3-(1-pyrrolidynyl)propyl(trimethoxy) silane, 3-(1-heptamethyleneimino)propyl(triethoxy) silane, 3-(1-dodecamethyleneimino)propyl(triethoxy) silane, 3-(1-hexamethyleneimino)propyl(diethoxy)methylsilane, 3-(1-hexamethyleneimino)propyl(diethoxy)ethylsilane, and 3-[10-(triethoxysilyl)decyl]-4-oxazoline. In one or more embodiments, the above-mentioned modifying agent can comprise 3-(1-hexamethyleneimino)propyl(triethoxy) silane and/or (1-hexamethyleneimino)methyl(trimethoxy) silane.

Examples of non-cyclic tertiary amine group-containing alkoxy silane compounds having the structure of formula (XIV) include, but are not limited to, 3-dimethylaminopropyl (triethoxy) silane, 3-dimethylaminopropyl(trimethoxy) silane, 3-diethylaminopropyl(triethoxy) silane, 3-diethylaminopropyl(trimethoxy) silane, 2-dimethylaminoethyl(triethoxy) silane, 2-dimethylaminoethyl(trimethoxy) silane, 3-dimethylaminopropyl(diethoxy)methylsilane, and 3-dibutylaminopropyl(triethoxy) silane. In one or more embodiments, the above-mentioned modifying agent can comprise 3-diethylaminopropyl(triethoxy) silane and/or 3-dimethylaminopropyl(triethoxy) silane.

Examples of disilazane group-containing alkoxy silane compounds having the structure of formula (XIV) include, but are not limited to, N,N-bis(trimethylsilyl)-3-aminopropyl (triethyoxy)silane, N,N-bis(trimethylsilyl)-3-aminopropyl (trimethoxy)silane, N,N-bis(trimethylsilyl)-3-aminopropyl (diethoxy)methylsilane, and N,N-bis(trimethylsilyl)-3-aminopropyl(dimethoxy)methylsilane.

Other suitable alkoxy silane compounds having the structure of formula (XIV) include, but are not limited to, 2-(trimethoxysilylethyl)pyridine, 2-(triethoxysilylethyl)pyridine, and 2-cyanoethyltriethoxy silane. Additionally, any of the foregoing examples of alkoxy silane compounds of formula (XIV) may be used alone or in combinations of two or more. Also, a partial condensate of the alkoxy silane compound may be used.

In one or more embodiments, the modifying agent can comprise a silicon-containing compound having the following structure:

$$R^{12}_p\text{—Si—}(OR^{13})_{4-p} \qquad \text{formula (XV)}$$

where $R^{12}$ and $R^{13}$ can be the same as mentioned above for $R^{10}$ and $R^{11}$ of formula (XIV), respectively; p is an integer of from 0 to 2; and when more than one $OR^{13}$ group is present, such groups can be the same as or different from one another.

Examples of suitable alkoxy silane compounds having the structure of formula (XV) include, but are not limited to, tetramethoxy silane, tetraethoxy silane, tetra-n-propoxy silane, tetraisopropoxy silane, tetra-n-butoxy silane, tetraisobutoxy silane, tetra-sec-butoxy silane, tetra-tert-butoxy silane, methyltrimethoxy silane, methyltriethoxy silane, methyltripropoxy silane, methyltriisopropoxy silane, ethyltrimethoxy silane, ethyltriethoxy silane, propyltriethoxy silane, butyltrimethoxy silane, phenyltrimethoxy silane, phenyltriethoxy silane, dimethyldimethoxy silane, methylphenyldimethoxy silane, vinyltrimethoxy silane, vinyltriethoxy silane, divinyldimethoxy silane, and divinyldiethoxy silane. In one or more embodiments, the above-mentioned modifying agent can comprise tetraethoxy silane.

The alkoxy silane compounds of formula (XV) may be used alone or in a combination of two or more. Also, a partial condensate of the alkoxy silane compound may be used.

In one or more embodiments, the modification reaction of the polymerizably active terminal with the above-described modifying agent can be carried out by a solution reaction. Such a solution may also include a monomer used during polymerization. Suitable solvents include those described above with reference to solvents suitable for use during polymerization. Also, the reaction system of the modification reaction is not particularly limited, and may be a batch system or a continuous system.

In various embodiments, the resulting modified polymer may be further modified on an active primary amine group of the starting terminal monomer residue with at least one isocyanate compound selected from compounds having an isocyanate group and condensates thereof. A modification reaction of the starting terminal monomer residue with an isocyanate compound can be carried out via a solution reaction, and the monomer used in the polymerization may also be included in such a solution. Moreover, in one more embodiments, no compound having an active proton is incorporated into the reaction solution other than the polymer having the active primary amine group. Also, since the polymerizably active terminal is inert to the isocyanate group, $Z^1$ of formulas (IX) or (X) can be a residue produced by reacting with the carbanion reactive compound, such as a polymerization terminator or a modifying agent discussed above. Furthermore, the reaction system of the modification reaction at the starting terminal monomer residue is not particularly limited, and may be a batch system or a continuous system.

As mentioned above, polymers prepared employing the above-described polymerization initiator can comprise a residue derived from the polymerization initiator. Thus, the resulting polymer can initially comprise a residue of the polymerization initiator that retains the above-described protected primary amine groups. Accordingly, in one or more embodiments, the resulting polymer can undergo one or more deprotection processes to yield a polymer having one or more unprotected primary amine groups. Any deprotection process known or hereafter discovered in the art can be employed that removes at least a portion of the above-described protecting groups and provides a polymer having at least one or at least two unprotected primary amine groups. For example, treatment of the polymer with tetra-n-butylammonium fluoride can be employed for deprotection of the protected primary amine groups. In various embodiments, a method employing steam stripping (e.g., during desolventization of the polymer), treatment with an acidic medium (e.g., addition of aqueous HCl, HCl in alcohol, or a mixture of both), coagulation with an alcohol, or hydrogenation can be employed. It should be noted, however, that retention of unsaturation in the resulting polymers can be desired; accordingly, hydrogenation is not employed in some embodiments. Thus, in one or more embodiments, the resulting polymer can undergo deprotection via steam stripping, treatment with an acidic medium, or coagulation with an alcohol. Therefore, in one or more embodiments, a polymer is provided having at least two unprotected primary amine groups and a plurality of C—C double bonds.

When treatment with an acidic medium is employed as a deprotection process, any known or hereafter discovered acidic medium can be employed. Examples of suitable acidic mediums include, but are not limited to, short-chain carboxylic acids, such as acetic acid, propionic acid, butyric acid, and valeric acid; fatty acids having a carbon chain length of at least 6, such as stearic acid, palmitic acid, and oleic acid; higher fatty acids, such as $C_6$ to $C_{50}$ fatty acids; and halogen acids, such as hydrochloric acid and hydrofluoric acid. In one or more embodiments, the initial polymer can undergo deprotection via contact with stearic acid.

As mentioned above, polymers prepared employing the above-described polymerization initiator can be included as at least a portion of the rubber component in rubber compositions. Additionally, modified polymers prepared employing the above-described polymerization initiator and modified thereafter can also be included as at least a portion of the rubber component in rubber compositions. In either case, the content of the polymer and/or modified polymer in the rubber component can be in an amount of at least 5 percent by weight, at least 10 percent by weight, at least 20 percent by weight, at least 25 percent by weight, or at least 50 percent by weight based on the entire weight of the rubber component in the rubber composition. In rubber compositions according to certain embodiments of the invention, natural rubber ("NR"), non-modified or other modified styrene-butadiene copolymers ("SBR"), polybutadiene rubber ("BR"), polyisoprene rubber ("IR"), butyl rubber ("IIR"), and ethylene-propylene copolymer may also be used as a portion of the rubber component in addition to the above-described polymer and/or modified polymer. In one or more embodiments, the rubber component of the rubber composition additionally comprises natural rubber. Furthermore, these types of rubber may be used alone or in a blend of two or more.

The rubber composition can also contain sulfur as a vulcanizing agent (i.e., a crosslinking agent). Thus, in one or more embodiments, the rubber composition can be sulfur-crosslinkable. Crosslinking the rubber composition with sulfur can provide the composition with strength suitable for use in rubber articles, such as, for example, tires and belts.

In one or more embodiments, the rubber composition can also contain carbon black and/or an inorganic filler. The carbon black and/or inorganic filler can be compounded in a total amount in the range of from about 10 to about 100 parts by weight per 100 parts of the rubber component (parts per hundred rubber, or "phr") as a filler. As the carbon black, FEF, SRF, HAF, ISAF, and SAF grades can be employed. In one or more embodiments, the carbon black comprises HAF, ISAF, and/or SAF grades.

The above-mentioned inorganic filler can comprise silica and/or an inorganic compound represented by the following formula:

$wM^2 \cdot xSiO_y \cdot zH_2O$     formula (XVI)

where $M^2$ can be a metal selected from the group consisting of aluminum, magnesium, titanium, calcium, and zirconium, an oxide or hydroxide of such a metal, a hydrate thereof, or at least one carbonate of these metals; and each of w, x, y and z is an integer of from 1 to 5, an integer of from 0 to 10, an integer of from 2 to 5, and an integer of from 0 to 10, respectively. When x and z are 0 in formula (XVI), the inorganic compound can be at least one metal selected from the group consisting of aluminum, magnesium, titanium, calcium, and zirconium, or a metal oxide or metal hydroxide thereof.

Examples of inorganic compounds having the structure of formula (XVI) include alumina ($Al_2O_3$), such as γ-alumina or α-alumina; alumina monohydrate ($Al_2O_3 \cdot H_2O$), such as boehmite or diaspore; aluminum hydroxide [$Al(OH)_3$], such as gibbsite or bayerite; aluminum carbonate [$Al_2(CO_3)_3$]; magnesium hydroxide [$Mg(OH)_2$]; magnesium oxide (MgO); magnesium carbonate ($MgCO_3$); talc ($3MgO \cdot 4SiO_2 \cdot H_2O$); attapulgite ($5MgO \cdot 8SiO_2 \cdot 9H_2O$); titanium white ($TiO_2$); titanium black ($TiO_{2n-1}$); calcium oxide (CaO); calcium hydroxide [$Ca(OH)_2$]; aluminum magnesium oxide ($MgO \cdot Al_2O_3$); clay ($Al_2O_3 \cdot 2SiO_2$); kaolin ($Al_2O_3 \cdot 2SiO_2 \cdot 2H_2O$); pyrophyllite ($Al_2O_3 \cdot 4SiO_2 \cdot H_2O$); bentonite ($Al_2O_3 \cdot 4SiO_2 \cdot 2H_2O$); aluminum silicates (e.g., $Al_2SiO_5$ and $Al_4 \cdot 3SiO_4 \cdot 5H_2O$); magnesium silicates (e.g., $Mg_2SiO_4$ and $MgSiO_3$); calcium silicate ($Ca_2SiO_4$); aluminum calcium silicate ($Al_2O_3 \cdot CaO \cdot 2SiO_2$); magnesium calcium silicate ($CaMgSiO_4$); calcium carbonate ($CaCO_3$); zirconium oxide ($ZrO_2$); zirconium hydroxide [$ZrO(OH)_2 \cdot nH_2O$]; zirconium carbonate [$Zr(CO_3)_2$]; and crystalline aluminosilicates including a hydrogen, an alkali metal, or an alkaline earth metal correcting electron charges, such as various zeolites.

In one or more embodiments, the inorganic filler can comprise silica, including wet silica or dry silica. In various embodiments, the inorganic filler comprises wet silica. The amount of silica compounded in the above-mentioned rubber composition can be in the range of from about 10 to 100 phr.

In addition, in one or more embodiments, the rubber composition can comprise a fatty acid as a mixing ingredient. Such fatty acids can be a fatty acid having at least 6 carbon atoms, a $C_6$ to $C_{22}$ fatty acid, or a higher fatty acid, such as a $C_{23}$ to $C_{50}$ fatty acid. In one or more embodiments, the fatty acid employed comprises stearic acid. As mentioned above, the polymer initially prepared employing the above-described polymerization initiator can comprise protected primary amine groups that can undergo a deprotection process, where such a deprotection process can comprise treatment with an acidic medium. In one or more embodiments, the above-described polymer can undergo deprotection via contact with a fatty acid employed during formation of a rubber composition. For instance, stearic acid employed as a component in the rubber composition can act to deprotect at least a portion of the protected amine groups present on the polymer component of the rubber composition. In one or more embodiments, the fatty acid can act to provide a polymer prepared using the above-described polymerization initiator having at least two unprotected primary amine groups.

In addition to the above rubber component, crosslinking agent, and filler, the rubber composition may be compounded with other additives employed in the rubber industry. For example, one or more antioxidants, softening agents, silane coupling agents, vulcanization accelerators, and/or accelerator activators may be employed in the rubber composition. The rubber composition can be produced by compounding the rubber component, including at least the optionally modified polymer prepared with the above-described polymerization initiator, with various additives, and then milling, warming, and extruding them.

In one or more embodiments, the resulting rubber composition can have a Mooney viscosity ($ML_{1+4}$, 100° C.) in the range of from about 20 to about 150 MU, or in the range of from 40 to 100 MU. The rubber composition can be used in rubber articles such as tires, belts, and the like. In one or more embodiments, the rubber composition is employed in various rubber members in a tire, such as a tire tread.

This invention can be further illustrated by the following examples of various embodiments thereof, although it will be understood that these examples are included merely for purposes of illustration and are not intended to limit the scope of the invention unless otherwise specifically indicated.

EXAMPLES

Example 1

Synthesis of Silylated BHMT-Li Initiator

To a solution of bis(hexamethylene)triamine ("BHMT") (8.8 g, 40.8 mmol) (Sigma-Aldrich, St. Louis, Mo., USA; Product No. 421960) and triethylamine (23.3 mL, 167.3 mmol) in dichloromethane (100 mL) was added a solution of 1,2-bis(chlorodimethylsilyl)ethane (18.0 g, 83.7 mmol) (Sigma-Aldrich, St. Louis, Mo., USA; Product No. 267880) in dichloromethane (100 mL) dropwise over a period of 30 minutes. The resulting mixture was then stirred vigorously at room temperature for 18 hours. Then the solvent was removed under reduced pressure of approximately 10 mmHg over a period of 3 hours. Hexane (50 mL) was then added to the residue and filtered through a glass filter. Next, the filtrate was dried under vacuum to yield silylated BHMT as a pale-yellow oil. This product was used without further purification.

Thereafter, the following ingredients were charged into a dry, nitrogen-purged bottle having a 200-mL capacity, which was equipped with a crown seal: silylated BHMT as prepared above (0.78 g, 1.56 mmol), anhydrous hexane (10.0 mL), and n-butyllithium (2.2 mmol, 1.38 mL of 1.6M solution in hexane). This solution was prepared right before use in polymerization, described below, and was estimated to be approximately 0.19M in silylated BHMT-Li.

Example 2

Synthesis of Silylated APPD-Li Initiator

To a solution of N-(3-aminopropyl)-1,3-propanediamine ("APPD") (9.3 g, 70.7 mmol) (Sigma-Aldrich, St. Louis, Mo., USA; Product No. 11006) and triethylamine (40.4 mL, 290.0 mmol) in dichloromethane (200 mL) was added a solution of 1,2-bis(chlorodimethylsilyl)ethane (31.2 g, 145.0 mmol) (Sigma-Aldrich, St. Louis, Mo., USA; Product No. 267880) in dichloromethane (200 mL) dropwise over a period of 30 minutes. The resulting mixture was then stirred vigorously at room temperature for 18 hours. Then the solvent was removed under reduced pressure of approximately 10 mmHg over a period of 3 hours. Hexane (50 mL) was then added to the residue and filtered through a glass filter. Next, the filtrate was dried under vacuum to yield silylated APPD as a pale-yellow oil. This product was used without further purification.

Thereafter, the following ingredients were charged into a dry, nitrogen-purged bottle having a 200-mL capacity, which was equipped with a crown seal: silylated APPD as prepared above (0.65 g, 1.56 mmol), anhydrous hexane (3.0 mL), and n-butyllithium (3.0 mmol, 1.87 mL of 1.6M solution in hexane). This solution was prepared right before use in polymerization, described below, and was estimated to be approximately 0.61M in silylated APPD-Li.

Example 3

Synthesis of Silylated nPPDA-Li Initiator

To a solution of N-propyl-1,3-diaminopropane ("nPPDA") (40 mL, 0.29 mol) (Sigma-Aldrich, St. Louis, Mo., USA; Product No. 308153) and triethylamine (88.8 mL, 0.64 mol) in dichloromethane (250 mL) was added a solution of 1,2-bis(chlorodimethylsilyl)ethane (68.6 g, 0.32 mmol) (Sigma-Aldrich, St. Louis, Mo., USA; Product No. 267880) in dichloromethane (250 mL) dropwise over a period of 30 minutes. The resulting mixture was stirred vigorously at room temperature for 18 hours. Then the solvent was removed under reduced pressure of approximately 10 mmHg over a period of 3 hours. Hexane (100 mL) was then added to the residue and filtered through a glass filter. The filtrate was dried under vacuum to yield silylated nPPDA as a pale-yellow oil. This product was used without further purification.

Thereafter, the following ingredients were charged into a dry, nitrogen-purged bottle having a 200-mL capacity, which was equipped with a crown seal: silylated nPPDA as prepared above (0.40 g, 1.56 mmol), anhydrous hexane (4.0 mL), and n-butyllithium (2.7 mmol, 1.70 mL of 1.6M solution in hexane). This solution was prepared right before use in polymerization, described below, and was estimated to be approximately 0.48M in silylated nPPDA-Li.

Example 4

Polymerization of BHMT-SBR Polymer

A sample of styrene-butadiene rubber ("SBR") was prepared employing the silylated BHMT-Li initiator prepared in Example 1 according to the following procedure. A dry, nitrogen purged bottle having a 750-mL capacity, which was equipped with a crown seal, was charged with 56 g of 1,3-butadiene, 14 g of styrene, and 230 g of anhydrous hexane. Then 4.0 mL of the silylated BHMT-Li solution prepared in Example 1 and 0.15 mL of a 1.6M solution of 2,2-bis(tetrahydrofuryl)propane in hexane were injected through the bottle seal. The bottle was placed in a 50° C. rotary water bath and allowed to polymerize for a period of 90 minutes. The resulting polymer cement was quenched with 2 mL of 2-propanol containing 16.7 weight percent of di-tert-butyl-p-cresol. The cement was dried over a drum-dryer to yield the BHMT-styrene-butadiene rubber ("BHMT-SBR") polymer sample. Some of the physical properties of the resulting BHMT-SBR polymer (Polymer ID "A") are summarized in Table 1, below.

Example 5

Polymerization of APPD-SBR Polymer

A sample of SBR was prepared employing the silylated APPD-Li initiator prepared in Example 2 employing the same procedure followed in Example 4, except that 1.0 mL of silylated APPD-Li solution prepared in Example 2 was used instead of the silylated BHMT-Li solution. Some of the physical properties of the resulting APPD-SBR polymer (Polymer ID "B") are summarized in Table 1, below.

Example 6

Polymerization of nPPDA-SBR Polymer

A sample of SBR was prepared employing the silylated nPPDA-Li initiator prepared in Example 3 employing the same procedure followed in Example 4, except that 1.6 mL of silylated nPPDA-Li solution prepared in Example 3 was used instead of the silylated BHMT-Li solution. Some of the physical properties of the resulting nPPDA-SBR polymer (Polymer ID "C") are summarized in Table 1, below.

Example 7

Polymerization of BHMT-SBR-DMI Polymer

A stirred 18.9 L autoclave-type reactor purged with nitrogen was filled with 317 g of anhydrous styrene, 1,270 g of 1,3-butadiene, and 7,384 g of anhydrous hexane. The mixture was heated and held at 50° C., then silylated BHMT as prepared in Example 1 (7.94 g, 15.9 mmol), 2,2-bis(tetrahydrofuryl)propane (3.27 mL, 1.6M solution in hexane), and n-butyllithium (9.92 mL, 1.6M solution in hexane) were charged through an injection port of the reactor in the order given. The polymerization was allowed to continue for 60 minutes. Thereafter, a 380 g cement sample was collected through a needle port in the bottom of the reactor and placed into a dry, nitrogen purged bottle having a 750-mL capacity, which was equipped with a crown seal.

Next, 1,3-dimethyl-2-imidazolidinone ("DMI") (0.065 mL, 0.60 mmol) (Sigma-Aldrich, St. Louis, Mo., USA; Product No. 40727) was charged into the bottle containing the cement sample. The bottle was placed in a 50° C. rotary water bath where the termination reaction was allowed to proceed for 30 minutes. The resulting polymer cement was quenched with 2 mL of 2-propanol containing 16.7 weight percent of di-tert-butyl-p-cresol. The resulting cement was dried over a drum-dryer to yield a dry polymer sample. Some of the physical properties of the resulting polymer (Polymer ID "D") are summarized in Table 1, below.

Example 8

Polymerization of Comparative SBR Polymer

A stirred 18.9 L autoclave-type reactor purged with nitrogen was filled with 317 g of anhydrous styrene, 1,270 g of 1,3-butadiene, and 7,384 g of anhydrous hexane. The mixture was heated and held at 50° C., then 2,2-bis(tetrahydrofuryl)propane (2.98 mL, 1.6M solution in hexane) and n-butyllithium (9.02 mL, 1.6M solution in hexane) were charged through an injection port of the reactor in the order given. After the polymerization was allowed to continue for 60 minutes, the entire contents of the reactor were dropped into 2-propanol containing approximately 1 weight percent of di-tert-butyl-p-cresol. The coagulated cement was then dried over a drum-dryer to yield a dry polymer sample. Some of the physical properties of the resulting polymer (Polymer ID "E") are summarized in Table 1, below.

TABLE 1

Physical Properties of Polymers A-E

| Example | Polymer ID | Mn (kg/mol) | PDI (Mw/Mn) | Mooney viscosity (MU) |
|---|---|---|---|---|
| 4 | A | 137.1 | 1.10 | 26.8 |
| 5 | B | 134.7 | 1.15 | 29.1 |
| 6 | C | 78.1 | 1.30 | 10.0 |
| 7 | D | 124.7 | 1.10 | 27.1 |
| 8 | E | 121.6 | 1.05 | 14.1 |

Examples 9-12

Compounding Polymers with Carbon Black Filler

A portion of polymer samples A, B, C, and E, as prepared in Examples 4, 5, 6, and 8, were compounded in a 65 g scale Brabender mixer, using a formulation according to the recipe shown in Table 2, below. Mooney viscosity measurements of the resulting rubber formulations were conducted according to ASTM D-1646-89. The rubber formulations were then cured at 171° C. for 15 minutes. Viscoelasticity of the cured rubber formulations was measured over deformation of 0.25-14.5% at 10 Hz and 60° C. The Polymer ID of the polymers used and the resulting properties are summarized in Table 3, below.

TABLE 2

Rubber Formulation with Carbon Black Filler

| Ingredient | Parts per hundred parts of rubber (PHR) |
|---|---|
| Polymer Sample | 100 |
| Carbon Black (HAF grade)[A] | 50 |
| Process Oil[B] | 10 |
| Stearic acid | 2 |
| Wax[C] | 2 |
| Anti-Oxidant[D] | 0.95 |
| Zinc oxide | 2.5 |
| Accelerator—Diphenyl Guanidine ("DPG")[E] | 0.3 |
| Accelerator—Dibenzothiazyl disulfide ("MBTS")[F] | 0.5 |
| Accelerator—N-tert-butyl-2-benzothiazole sulfenamide ("TBBS")[G] | 0.5 |
| Sulfur | 1.5 |

[A]Continex N339 (Available from Continental Carbon Co., Houston, TX, USA)
[B]Hyprene BO300 (Available from Ergon Refining, Inc., Jackson, MS, USA)
[C]Microcrystalline wax
[D]Stantoflex 13 (Available from Flexsys, St. Louis, MO, USA)
[E]Perkacit DPG (Available from Flexsys, St. Louis, MO, USA)
[F]Perkacit MBTS (Available from Flexsys, St. Louis, MO, USA)
[G]Santocure TBBS (Available from Flexsys, St. Louis, MO, USA)

TABLE 3

Properties of Rubber Formulations with Carbon Black Filler

| Example | Polymer ID | Mooney viscosity (MU) | Tan δ at 3% |
|---|---|---|---|
| 9 | A | 78.0 | 0.090 |
| 10 | B | 54.6 | 0.106 |
| 11 | C | 36.1 | 0.127 |
| 12 | E | 38.9 | 0.220 |

As can be seen from the results listed in Table 3, Polymers C and E each have undesirably lower Mooney viscosities, coupled with higher tan δ values. Such characteristics are the result of having fewer or no primary amine groups located on the starting terminal monomer residue formed from the respective polymerization initiator employed.

Examples 13-17

Compounding Polymers with Natural Rubber and Carbon Black Filler

A portion of polymer samples A-E, as prepared in Examples 4-8, were compounded in a 65 g scale Brabender mixer, using a formulation according to the recipe shown in Table 4, below. Mooney viscosity measurements of the resulting rubber formulations were conducted according to ASTM D-1646-89. The rubber formulations were then cured at 160° C. for 15 minutes. Viscoelasticity of the cured rubber formulations was measured over deformation of 0.25-25% at 15 Hz and 50° C. The Polymer ID of the polymers used and the resulting properties are summarized in Table 5, below.

TABLE 4

Rubber Formulations with Natural Rubber and Carbon Black Filler

| Ingredient | Parts per hundred parts of rubber (PHR) |
|---|---|
| Polymer Sample | 50 |
| Natural Rubber | 50 |
| Carbon Black (HAF grade)[A] | 50 |
| Process Oil[B] | 10 |
| Stearic acid | 2 |
| Wax[C] | 2 |
| Anti-Oxidant[D] | 1 |
| Zinc oxide | 2.5 |
| Accelerator—Diphenyl Guanidine ("DPG")[E] | 0.3 |
| Accelerator—Dibenzothiazyl disulfide ("MBTS")[F] | 0.5 |
| Accelerator—N-tert-butyl-2-benzothiazole sulfenamide ("TBBS")[G] | 0.5 |
| Sulfur | 1.5 |

[A]Continex N339 (Available from Continental Carbon Co., Houston, TX, USA)
[B]Hyprene BO300 (Available from Ergon Refining, Inc., Jackson, MS, USA)
[C]Microcrystalline wax
[D]Stantoflex 13 (Available from Flexsys, St. Louis, MO, USA)
[E]Perkacit DPG (Available from Flexsys, St. Louis, MO, USA)
[F]Perkacit MBTS (Available from Flexsys, St. Louis, MO, USA)
[G]Santocure TBBS (Available from Flexsys, St. Louis, MO, USA)

TABLE 5

Properties of Rubber Formulations with Natural Rubber and Carbon Black Filler

| Example | Polymer ID | Mooney viscosity (MU) | Tan δ at 3% |
|---|---|---|---|
| 13 | A | 61.8 | 0.136 |
| 14 | B | 53.7 | 0.148 |
| 15 | C | 45.0 | 0.166 |

TABLE 5-continued

Properties of Rubber Formulations with
Natural Rubber and Carbon Black Filler

| Example | Polymer ID | Mooney viscosity (MU) | Tan δ at 3% |
|---|---|---|---|
| 16 | D | 64.4 | 0.105 |
| 17 | E | 39.3 | 0.219 |

As can be seen from the results listed in Table 5, Polymers C and E again each have undesirably lower Mooney viscosities, coupled with higher tan δ values. Such characteristics are the result of having fewer or no primary amine groups located on the starting terminal monomer residue formed from the respective polymerization initiator employed. In contrast, Polymer D presents improvements in both Mooney viscosity and tan δ values over Polymers A and B. This can be attributed to the fact that that Polymer D was modified with 1,3-dimethyl-2-imidazolidinone.

Examples 18 and 19

Compounding Polymers with Natural Rubber and Silica Filler

A portion of polymer samples A and E, as prepared in Examples 4 and 8, were compounded in a 65 g scale Brabender mixer, using a formulation according to the recipe shown in Table 6, below. Mooney viscosity measurements of the resulting rubber formulations were conducted according to ASTM D-1646-89. The rubber formulations were then cured at 160° C. for 15 minutes. Viscoelasticity of the cured rubber formulations was measured over deformation of 0.25-25% at 15 Hz and 50° C. The Polymer ID of the polymers used and the resulting properties are summarized in Table 7, below.

TABLE 6

Rubber Formulations with Natural Rubber and Silica Filler

| Ingredient | Parts per hundred parts of rubber (PHR) |
|---|---|
| Polymer Sample | 50 |
| Natural Rubber | 50 |
| Silica (AQ grade)[A] | 55 |
| Process Oil[B] | 10 |
| Coupling Agent[C] | 5 |
| Stearic acid | 2 |
| Wax[D] | 2 |
| Anti-Oxidant[E] | 1 |
| Zinc oxide | 2.5 |
| Accelerator—Diphenyl Guanidine ("DPG")[F] | 1.4 |
| Accelerator—Dibenzothiazyl disulfide ("MBTS")[G] | 2 |
| Accelerator—N-tert-butyl-2-benzothiazole sulfenamide ("TBBS")[H] | 0.7 |
| Sulfur | 1.5 |

[A]Hi-Sil 190G (Available from PPG Industries, Inc., Pittsburg, PA, USA)
[B]Hyprene BO300 (Available from Ergon Refining, Inc., Jackson, MS, USA)
[C]Silquest A-1589 (Available from Momentive Performance Materials, Inc., Albany, NY, USA)
[D]Microcrystalline wax
[E]Stantoflex 13 (Available from Flexsys, St. Louis, MO, USA)
[F]Perkacit DPG (Available from Flexsys, St. Louis, MO, USA)
[G]Perkacit MBTS (Available from Flexsys, St. Louis, MO, USA)
[H]Santocure TBBS (Available from Flexsys, St. Louis, MO, USA)

TABLE 7

Properties of Rubber Formulations with
Natural Rubber and Silica Filler

| Example | Polymer ID | Mooney viscosity (MU) | Tan δ at 10% |
|---|---|---|---|
| 18 | A | 65.1 | 0.128 |
| 19 | E | 29.4 | 0.173 |

As can be seen from the results listed in Table 7, Polymer E again has an undesirably lower Mooney viscosity, coupled with a higher tan δ value. Such characteristics are the result of having no primary amine groups located on the starting terminal monomer residue formed from the polymerization initiator employed.

SELECTED DEFINITIONS

It should be understood that the following is not intended to be an exclusive list of defined terms. Other definitions may be provided in the foregoing description accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

What is claimed is:

1. A polymerization initiator comprising: at least two protected primary amine groups and at least one metal selected from the group consisting of alkali and alkaline earth metals, wherein said at least one metal is not located on any of said protected primary amine groups.

2. The polymerization initiator of claim 1, wherein each of said protected primary amine groups comprises two protecting groups, wherein one or more of said protecting groups comprise a substituted silyl or silylene group.

3. The polymerization initiator of claim 2, wherein said protecting groups are removable via steam stripping and/or treatment with an acidic medium of a polymer prepared employing said polymerization initiator.

4. The polymerization initiator of claim 1, wherein said at least one metal comprises lithium, wherein said at least one metal is located on a secondary amine group in said polymerization initiator.

5. The polymerization initiator of claim 1, wherein said polymerization initiator has a structure of either:

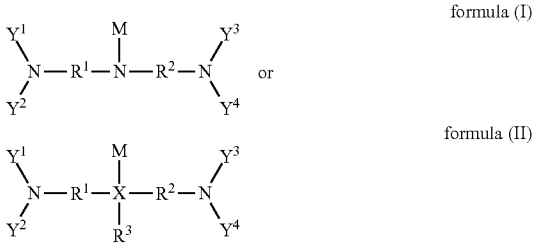

formula (I)

formula (II)

wherein $Y^1$, $Y^2$, $Y^3$, and $Y^4$ are independently substituted silyl or silylene groups; wherein $R^1$ and $R^2$ are independently a direct bond or any alkylene or arylene group having up to 20 carbon atoms; wherein $R^3$ is a hydrogen atom or an alkyl or aryl group having a carbon number of from 1 to 20, and may include heteroatoms; wherein $Y^1$, $Y^2$, $Y^3$, $Y^4$, $R^1$, $R^2$, and/or $R^3$ may be directly or indirectly bonded to each other to form one or more cyclic structures; wherein M is an alkali metal or an alkaline earth metal; wherein X is a carbon atom, a silicon atom, or a tin atom.

6. The polymerization initiator of claim 5, wherein said polymerization initiator has the structure of formula (I), wherein M is lithium.

7. The polymerization initiator of claim 5, wherein said polymerization initiator has a structure of either:

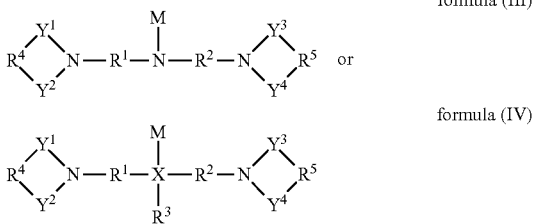

formula (III)

formula (IV)

wherein each of $Y^1$, $Y^2$, $Y^3$, and $Y^4$ is a dialkyl substituted silylene group, wherein each of $R^4$ and $R^5$ is an alkylene or arylene group having a carbon number of from 1 to 20, and may include heteroatoms.

8. The polymerization initiator of claim 7, wherein each of $Y^1$, $Y^2$, $Y^3$, and $Y^4$ is a dimethylsilylene.

9. The polymerization initiator of claim 7, wherein each of $R^4$ and $R^5$ is individually selected from the group consisting of 1,2-ethylene, 1,3-n-propylene, and 1,4-n-butylene.

10. The polymerization initiator of claim 5, wherein each of $R^1$ and $R^2$ is a straight-chain $C_3$ to $C_9$ alkylene group.

11. The polymerization initiator of claim 1, wherein said polymerization initiator comprises silylated bis(hexamethylene)triamine-lithium.

12. A composition comprising: a polymer comprising at least one residue of a polymerization initiator, wherein said polymerization initiator comprises at least two protected primary amine groups.

13. The composition of claim 12, wherein said polymerization initiator comprises at least one metal selected from alkali metals and alkaline earth metals.

14. The composition of claim 13, wherein said at least one metal comprises lithium, wherein said at least one metal is located on a secondary amine group in said polymerization initiator.

15. The composition of claim 12, wherein each of said protected primary amine groups comprises two protecting groups, wherein one or more of said protecting groups comprise a substituted silyl group.

16. The composition of claim 12, wherein said protecting groups are pendent on said residue of said polymerization initiator, wherein said protecting groups are removable via steam stripping and/or treatment with an acidic medium of said polymer.

17. The composition of claim 12, wherein said residue of said polymerization initiator is located at the starting terminal position of said polymer.

18. The composition of claim 12, wherein said polymer comprises a homopolymer of a conjugated diene compound or a copolymer of a conjugated diene compound and an aromatic vinyl compound.

19. The composition of claim 18, wherein said conjugated diene compound comprises 1,3-butadiene and/or isoprene, wherein said aromatic vinyl compound comprises styrene.

20. The composition of claim 12, wherein said polymer has a structure of either:

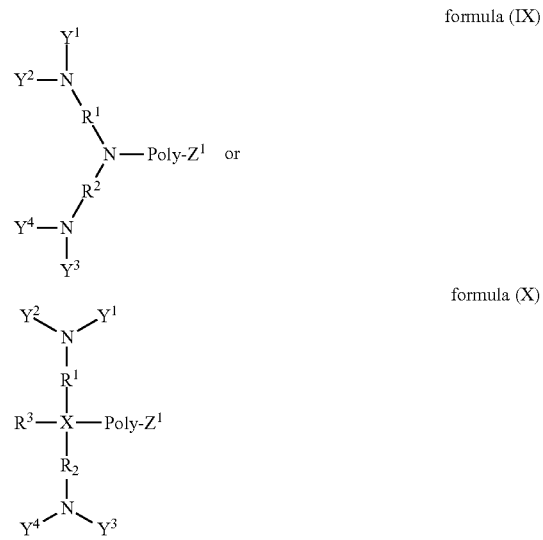

formula (IX)

formula (X)

wherein $Y^1$, $Y^2$, $Y^3$, and $Y^4$ are independently substituted silyl groups or hydrogen atoms; wherein $R^1$ and $R^2$ are independently a direct bond or any alkylene or arylene group having up to 20 carbon atoms, and may include heteroatoms; wherein $R^3$ is a hydrogen atom or an alkyl or aryl group having a carbon number of from 1 to 20, and may include heteroatoms; wherein $Y^1$, $Y^2$, $Y^3$, $Y^4$, $R^1$, $R^2$, and/or $R^3$ may be directly or indirectly bonded to each other to form one or more cyclic strictures; wherein $Z^1$ is an alkali metal, an alkaline earth metal, or a residue of a polymerization terminator; wherein X is a carbon atom or a tin atom, wherein Poly is a homopolymer of a conjugated diene compound or a copolymer of a conjugated diene compound and an aromatic vinyl compound.

21. The composition of claim 20, wherein said polymer has the structure of formula (IX), wherein each of $Y^1$, $Y^2$, $Y^3$, and $Y^4$ is a hydrogen atom, wherein each of $R^1$ and $R^2$ is a straight-chain $C_3$ to $C_9$ alkylene group, wherein $Z^1$ is a residue of a polymerization terminator, wherein said polymerization terminator comprises a carbanion reactive compound.

22. The composition of claim 12, wherein said polymer has a Mooney viscosity ($ML_{1+4}$, 100° C.) in the range of from about 5 to about 100 MU, wherein said polymer has a number average molecular weight ("Mn") in the range of from about 5,000 to about 500,000 g/mol.

23. The composition of claim 12, wherein said polymerization initiator has a structure of either:

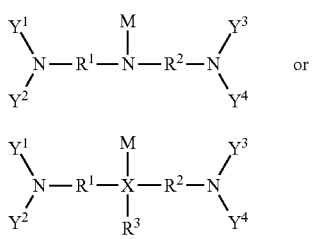

wherein $Y^1$, $Y^2$, $Y^3$, and $Y^4$ are independently substituted silyl or silylene groups; wherein $R^1$ and $R^2$ are independently a direct bond or any alkylene or arylene group having up to 20 carbon atoms, and may include heteroatoms; wherein $R^3$ is a hydrogen atom or an alkyl or aryl group having a carbon number of from 1 to 20, and may include heteroatoms; wherein $Y^1$, $Y^2$, $Y^3$, $Y^4$, $R^1$, $R^2$, and/or $R^3$ may be directly or indirectly bonded to each other to form one or more cyclic structures; wherein M is an alkali metal or an alkaline earth metal; wherein X is a carbon atom, a silicon atom, or a tin atom.

24. The composition of claim 23, wherein said polymerization initiator has the structure of formula (I), wherein M is lithium, wherein each of $R^1$ and $R^2$ is a straight-chain $C_3$ to $C_9$ alkylene group.

25. The composition of claim 23, wherein said polymerization initiator has a structure of either:

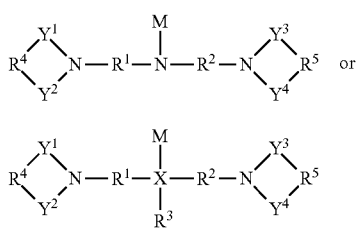

wherein each of $Y^1$, $Y^2$, $Y^3$, and $Y^4$ is a dimethylsilylene, wherein each of $R^4$ and $R^5$ is an alkylene or arylene group having a carbon number of from 1 to 20, and may include heteroatoms, wherein each of $R^1$ and $R^2$ is a straight-chain $C_3$ to $C_9$ alkylene group.

26. The composition of claim 12, wherein said composition further comprises at least one additional rubber component.

27. The composition of claim 26, wherein said composition comprises at least 20 parts per hundred rubber ("phr") of said polymer, wherein said rubber component is selected from the group consisting of natural rubber, polyisoprene, polybutadiene, and styrene-butadiene copolymer rubber.

28. The composition of claim 26, wherein said composition further comprises carbon black and/or an inorganic filler in an amount in the range of from about 10 to about 100 phr.

29. The composition of claim 26, wherein said composition further comprises at least one fatty acid.

30. The composition of claim 26, wherein said composition is sulfur-crosslinkable.

31. The composition of claim 26, wherein said composition has a Mooney viscosity ($ML_{1+4}$, 100° C.) in the range of from about 20 to about 150 MU.

32. A method of making a polymer, said method comprising: combining at least one type of monomer with at least one polymerization initiator to thereby form said polymer, wherein said polymerization initiator comprises at least two protected primary amine groups, wherein said polymer comprises at least one residue of said polymerization initiator.

33. The method of claim 32, wherein said monomer comprises a conjugated diene compound or a mixture of a conjugated diene compound and an aromatic vinyl compound.

34. The method of claim 33, wherein said conjugated diene compound comprises 1,3-butadiene and/or isoprene, wherein said aromatic vinyl compound comprises styrene.

35. The method of claim 32, wherein said polymerization initiator is initially combined with a first portion of said monomer to thereby form an oligomer, wherein said oligomer is thereafter combined with a second portion of said monomer to thereby form said polymer.

36. The method of claim 32, wherein said polymerization initiator is formed in situ with said monomer by combining at least one alkali metal or alkaline earth metal with a polymerization initiator precursor to thereby form said polymerization initiator.

37. The method of claim 32, wherein said polymerization initiator comprises at least one metal selected from alkali metals and alkaline earth metals, wherein said at least one metal is located on a secondary amine group in said polymerization initiator.

38. The method of claim 32, wherein said polymerization initiator is present in an amount in the range of from about 0.2 to about 20 mmol per 100 g of said monomer.

39. The method of claim 32, wherein each of said protected primary amine groups comprises two protecting groups, wherein said protecting groups initially remain pendent on said residue of said polymerization initiator, further comprising subjecting at least a portion of said polymer to at least one deprotection process.

40. The method of claim 39, wherein said deprotection process comprises steam stripping and/or treatment with an acidic medium.

41. The method of claim 32, wherein said polymerization initiator has a structure of either:

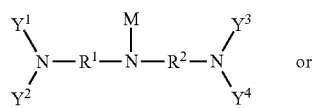

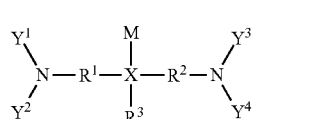

wherein $Y^1$, $Y^2$, $Y^3$, and $Y^4$ are independently substituted silyl groups; wherein $R^1$ and $R^2$ are independently a direct bond or any alkylene or arylene group having up to 20 carbon atoms, and may include heteroatoms; wherein $R^3$ is a hydrogen atom or an alkyl or aryl group having a carbon number of from 1 to 20, and may include heteroatoms; wherein $Y^1$, $Y^2$, $Y^3$, $Y^4$, $R^1$, $R^2$, and/or $R^3$ may be directly or indirectly bonded to each other to form one or more cyclic structures; wherein M is an alkali metal or an alkaline earth metal; wherein X is a carbon atom, a silicon atom, or a tin atom.

42. The method of claim 41, wherein said polymerization initiator has a structure of either:

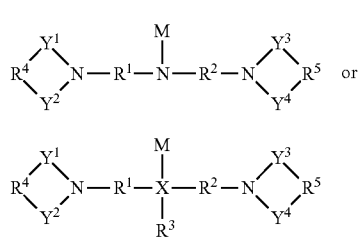

formula (III)

or formula (IV)

wherein each of $Y^1$, $Y^2$, $Y^3$, and $Y^4$ is a dimethylsilylene, wherein each of $R^4$ and $R^5$ is a straight-chain alkylene group having a carbon number of from 1 to 4, wherein each of $R^1$ and $R^2$ is a straight-chain $C_3$ to $C_9$ alkylene group.

43. The method of claim 32, wherein said polymer and/or said initiator is prepared in the presence of at least one Lewis base.

44. A functionalized polymer defined by at least one of the following formula:

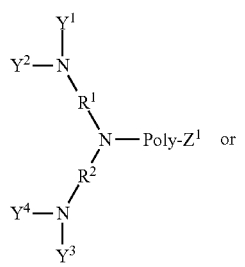

formula (IX)

or

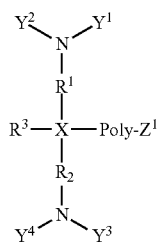

formula (X)

wherein $Y^1$, $Y^2$, $Y^3$, and $Y^4$ are independently substituted silyl groups or hydrogen atoms; wherein $R^1$ and $R^2$ are independently a direct bond or any alkylene or arylene group having up to 20 carbon atoms, and may include heteroatoms; wherein $R^3$ is a hydrogen atom or an alkyl or aryl group having a carbon number of from 1 to 20, and may include heteroatoms; wherein $Y^1$, $Y^2$, $Y^3$, $Y^4$, $R^1$, $R^2$, and/or $R^3$ may be directly or indirectly bonded to each other to form one or more cyclic structures; wherein $Z^1$ is an alkali metal, an alkaline earth metal, or a residue of a polymerization terminator; wherein X is a carbon atom or a tin atom, wherein Poly is a homopolymer of a conjugated diene compound or a copolymer of a conjugated diene compound and an aromatic vinyl compound.

\* \* \* \* \*